Aug. 27, 1929.  F. PEACOCK  1,726,191
BUMPER FOR AUTOMOBILES
Filed Sept. 11, 1928
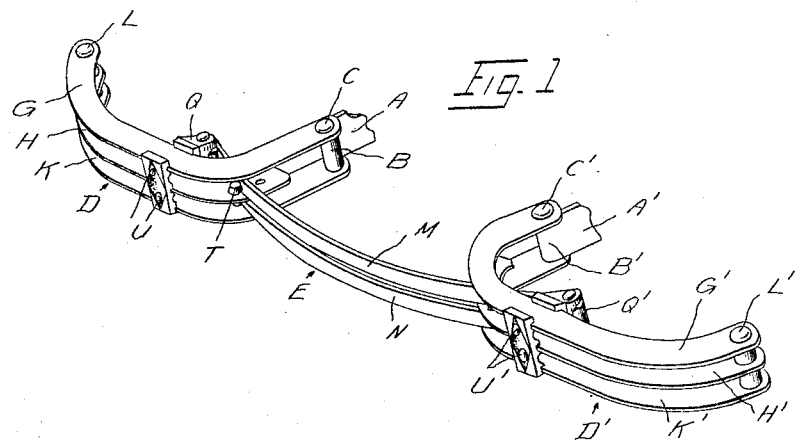
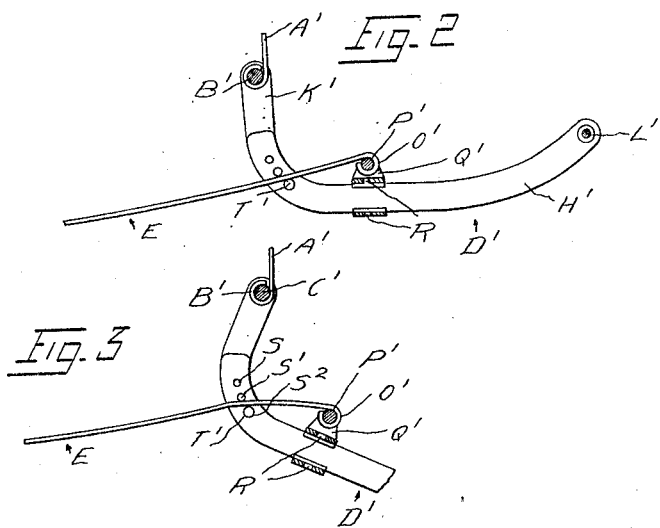
Inventor:
Frank Peacock
BY: Reegs, Bayes & Bakelar
ATTORNEYS.

Patented Aug. 27, 1929.

1,726,191

UNITED STATES PATENT OFFICE.

FRANK PEACOCK, OF CROYDEN, NEAR SYDNEY, NEW SOUTH WALES, AUSTRALIA.

BUMPER FOR AUTOMOBILES.

Application filed September 11, 1928, Serial No. 305,155, and in Australia September 15, 1927.

Heretofore bumper bars for automobiles have been commonly constructed as one member, constituted of one or more bars, with or without flexibility within itself. These bumpers have been mounted on the dumb irons of the chassis by means of either rigid or resilient brackets. Rear fenders of the "full across" type have been made on the same principle, and rear fenders of the "quarter" type have been made as independent members which are respectively mounted on one of the rear "dumb irons."

The present invention introduces a broadly new feature into the design of these devices.

It is conceived that in order to have effective utility, bumper bars should be capable of buffering impacts and slowing up the speed of a car, so as thereby to lessen the damage which takes place when impact takes place between it and another solid body. Heretofore, a limited degree of buffering is obtained in the flexure of springs which are associated with the brackets by which the bars are held on the dumb irons, or by the bending of the bar or the crushing of the brackets. My invention has been devised with the object of obtaining a desirable range of buffering movement within the structure of the bumper. The bumper is constituted of three members—two of these are flank or wing members; the third member connects the wing members. Each wing member is mounted by pivots at one end of it on one of the dumb iron brackets, with liberty to swing about the pivot forwardly and rearwardly in an horizontal plane. The two wing members are held resiliently at their normal position by the intermediately disposed connecting member. The wing members are substantially rigid within themselves. The connecting member is the flexible element in the assembly, and it is flexed when either of the wing members is deflected; the connecting member is also capable of buffering impact upon itself.

Bumpers on this system of construction are capable of taking care of reverse shocks. Thus, for instance, in backing a car, the fore end bumpers sometimes foul a gatepost or other obstruction, and in the absence of provision in bumpers to meet this condition, liability to injury and breakage is present.

In the accompanying drawings:—

Fig. 1 is a perspective view of a "bumper" according to the invention;

Fig. 2 is a horizontal section through one of the wing members and through a portion of the connecting member, showing their relative positions whilst at rest; and Fig. 3 is a like section showing the relative positions of the same parts when either of the wing members is deflected from the position of rest.

AA' are brackets which are bolted or clamped to the dumb irons. At their forward ends eyes BB' are rolled or forged on them to carry the pivot bolts CC' which respectively carry the curved wing members DD'. E is the connecting member. It is preferred to constitute the wing members of three "rail-edge" bars G, H, K, with the middle bar H shortened, all three bars being fixed together at the outer ends by rivets or bolts LL' and the pivot bolts CC' engaging the inner ends of the top and bottom bars G and K, and it is preferred to construct the connecting member E of two bowed bars MN of spring steel disposed flatwise, with eyes OO' rolled in their ends to carry coupler bolts PP' which are held in lugs QQ' which are tightly clamped on the wing members DD' by bolts U which pass through the bolt holes R. SS' S² are holes drilled in the inturned end of the mid wing bar H' to carry chock bolts TT' against which the faces of the two bars of the connecting member E contact.

In setting up the bumper, the chock bolts TT' are set in the appropriate holes (SS' S²) and the clamps QQ' are fixed by their bolts U at such postions on the wing members DD' that the connecting member E is flexed backward more or less. The assembly DD'E is thus held more or less rigidly but capable of flexing when any part of the structure is subjected to impact. If for instance the wing member D should strike an obstruction so that it is swung backward on its pivotal support C, pull will be applied through the connecting member E to the other wing member D' tending to swing it forward (see Fig. 3), but as in its forward swinging movement the chock T' bears back against the connecting member E, the resistance of that member to flexure limits the range of the movement, and, when the pressure acting against the member D is relieved, the three members DD'E will return to their normal positions as seen in Fig. 1. If one of the wing members be forced outward, as may happen if it foul an obstruction whilst the car is being backed, its movement will be restrained by the flexure of the connecting member E; this condition is illustrated in Fig. 3.

The stiffness of the assembly will depend on the dimensions of the bars MN and the initial deflection given them in setting up the assembly by the positioning of the chocks TT', and the positioning of the clamps QQ'. Under extreme stress the clamps QQ' may drag; this will probably occur before any of the bars collapse.

Rear bumpers are constructed in the same principle as front bumpers.

For cars which carry a spare wheel or a spare rim behind the body, bumpers according to this invention are particularly useful, as the connecting member may be unshipped to obtain room to facilitate wheel changing or rim changing.

What I claim as my invention and desire to secure by Letters Patent is:—

1. A bumper or rear fender having buffering action and constituted of an assembly of three coupled members whereof the outer members have pivotal supports at their inner ends and the intermediate member is flexibly fixed at its ends to said outer members.

2. A bumper or fender constituted of two wing members each constructed of three "rail-edge" curved bars with pivotal mountings for attachment to dumb irons on their neighboring ends, and a mid connecting member constructed of two flatwise bowed spring bars adjustably attached terminally to outer parts of said wing members in such a way that they are flexed when either of said wing members suffers pivotal movement, substantially as described.

3. A bumper or rear fender constructed of three coupled members including two curved rigid wing members with pivot mountings on their inner ends adapted for carrying them on car dumb irons, and a flexible member pivotally connected at its ends to said wing members in such a way that it holds those members in their normal positions and is flexed when either of them is deflected from that position.

4. A bumper or rear fender having buffering action when stressed, and characterized in that it is constructed of two pivotally mounted wing members which are curved at their inner ends, and a mid connecting spring member so coupled to said wing members that any movement of either of said wing members on its pivot is resolved into a bending movement on the mid connecting member.

5. A bumper or rear fender constructed of two pivotally mounted wing members and a flexible intermediate member pivotally connected thereto, characterized in that said wing members are capable of restrained movement on their respective pivotal supports either forwardly or rearwardly.

6. A bumper constructed of three coupled members including two rigid wing members and an intermediate flexible member, said wing members having pivotal supports at their inner ends, and coupling means adapted to permit either wing member to deflect either backwardly or forwardly under restraint of said intermediate member.

In testimony whereof I affix my signature.

FRANK PEACOCK.